United States Patent
Marsden

(10) Patent No.: US 7,032,854 B2
(45) Date of Patent: Apr. 25, 2006

(54) CORD SHORTENER

(75) Inventor: Andrew W. Marsden, Hingham, MA (US)

(73) Assignee: Cosco Management, Inc., Wilmington, DE (US)

( * ) Notice: Subject to any disclaimer, the term of this patent is extended or adjusted under 35 U.S.C. 154(b) by 145 days.

(21) Appl. No.: 10/698,613

(22) Filed: Oct. 31, 2003

(65) Prior Publication Data

US 2005/0092861 A1    May 5, 2005

(51) Int. Cl.
*B65H 75/38* (2006.01)

(52) U.S. Cl. ............... 242/388.1; 242/398; 242/405.1; 242/588.6

(58) Field of Classification Search ............ 242/388, 242/388.1, 388.5, 398, 405, 405.1, 407, 588, 242/588.4, 588.6; 206/409, 702; 191/12 R, 191/12.2 R, 12.4
See application file for complete search history.

(56) References Cited

U.S. PATENT DOCUMENTS

| | | | |
|---|---|---|---|
| 447,889 A | 3/1891 | Matteson | |
| 2,364,262 A | 12/1944 | Wehringer | |
| 2,576,335 A | 11/1951 | Fanslow | |
| 2,952,420 A | 9/1960 | Von Hoorn | |
| 3,208,121 A | 9/1965 | Prince | |
| 3,381,916 A | 5/1968 | Edgell | |
| 3,446,343 A * | 5/1969 | Van Rooij et al. | 242/588.6 |
| 3,782,654 A | 1/1974 | Kasa | |
| 4,073,449 A | 2/1978 | Pilat | |
| 4,150,798 A | 4/1979 | Aragon | |
| 4,700,835 A * | 10/1987 | Rognsvoog, Jr. | 242/588.4 |
| 4,705,484 A | 11/1987 | Lerner et al. | |
| 4,726,536 A | 2/1988 | Lerner et al. | |
| 4,844,373 A | 7/1989 | Fike, Sr. | |
| 4,901,938 A | 2/1990 | Cantley et al. | |
| 4,940,859 A | 7/1990 | Peterson | |
| 4,946,010 A | 8/1990 | DiBono | |
| D341,076 S | 11/1993 | Kolton | |
| 5,613,648 A | 3/1997 | Paavila | |
| 5,669,571 A | 9/1997 | Graybill | |
| 5,735,400 A * | 4/1998 | Packard | 242/588.6 |
| 5,772,152 A | 6/1998 | Maldonado | |
| 5,857,285 A * | 1/1999 | Little | 242/405 |
| 5,992,787 A | 11/1999 | Burke | |
| D419,426 S | 1/2000 | Kovacik et al. | |
| 6,324,285 B1 | 11/2001 | Dowsett et al. | |
| 6,600,479 B1 * | 7/2003 | Smith et al. | |
| 2003/0168545 A1 * | 9/2003 | Yu | 242/388.1 |

FOREIGN PATENT DOCUMENTS

| GB | 2 210 844 | * | 6/1989 |
|---|---|---|---|
| JP | 4-243774 | * | 8/1992 |

OTHER PUBLICATIONS

(16) sheets of color photographs of Cord Short'ner device and packaging (that was submitted with Nov. 25, 2003 IDS). Cord Short'ner device, Safety 1st, unknown date (at least as early as Jun., 2002).

* cited by examiner

*Primary Examiner*—William A. Rivera
(74) *Attorney, Agent, or Firm*—Barnes & Thornburg LLP

(57) ABSTRACT

A cord shortening device includes a housing having a first portion and a second portion. One of the portions includes a post configured to windably receive a first section of a length of cord. At least one of the portions has an opening at one end for mating second and third sections of the length of cord.

17 Claims, 4 Drawing Sheets

CORD SHORTENER

BACKGROUND

The present disclosure relates to cord shorteners, and more particularly, to a cord shortening device that secures and stores a portion of a length of cord from, for example, an electric appliance.

Cord storage and take-up devices are known. Generally, those devices involve either a manual or mechanical winding of a length of cord around a spool inside the device. The devices typically include a number of parts connected together and have housings for storing and/or securing excess lengths of cord.

SUMMARY

According to the present disclosure, a cord shortener, for storing an excess section of a length of cord, such as an electrical wire from an appliance, includes a monolithic, or one-piece, housing that has a first portion and a second portion monolithically connected by a living hinge. The monolithic housing is adapted to open and close by rotating one or both of the first and second portions about the living hinge. One of the portions includes a monolithically incorporated post which is configured to windably receive a first section of a length of cord. At least one of the first and second portions has an opening at at least one end to receive a second and third sections of cord.

The monolithic housing further has at least one monolithic closing mechanism operable when one or both of the portions are rotated about the living hinge and closed on one another.

Other aspects of the present disclosure will become apparent from the following descriptions when considered in conjunction with the accompanying drawings.

DETAILED DESCRIPTION OF THE DRAWINGS

Figure 1:
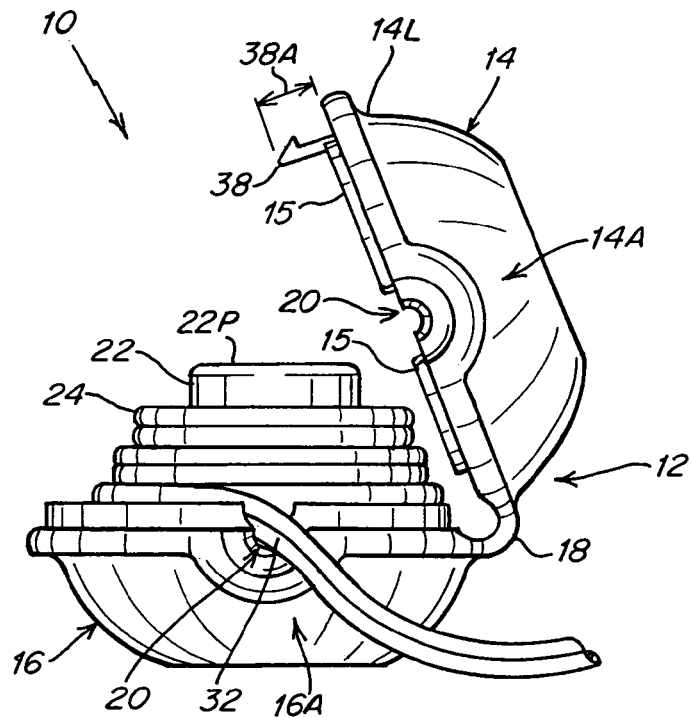
FIG. 1 is an end view showing a cord shortening device in an opened condition, according to the principles of the present disclosure.
Figure 2:
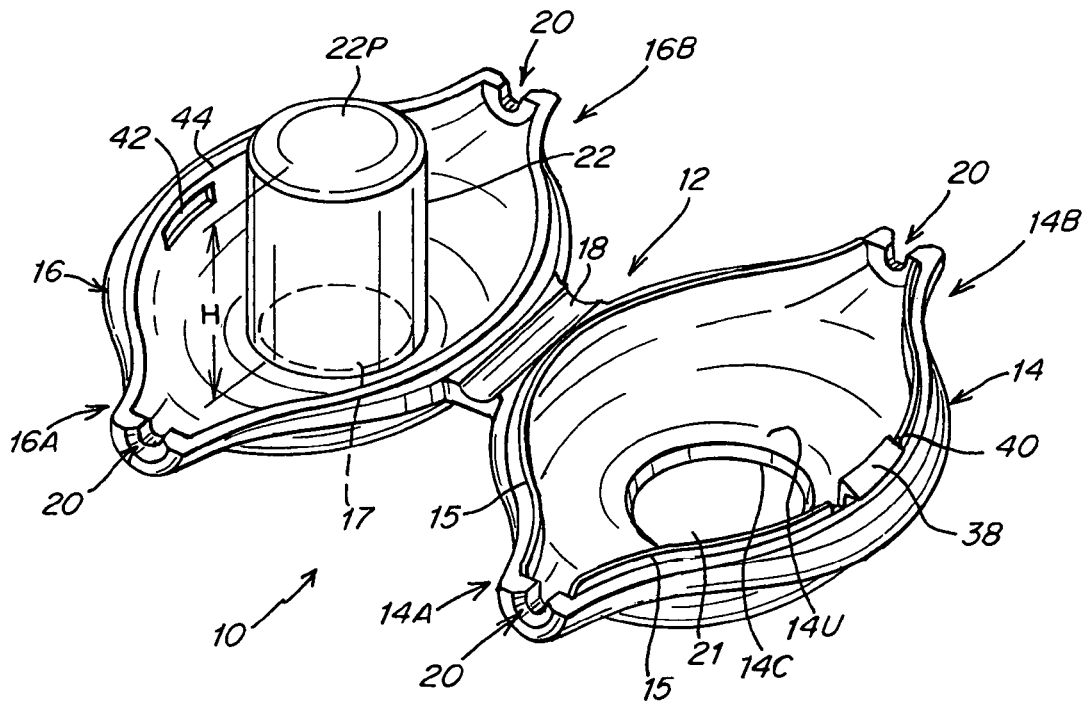
FIG. 2 is a perspective view of a cord shortening device in another opened condition, according to the principles of the present disclosure.

An embodiment of a cord shortening device 10 is shown, for example, in FIGS. 1 and 2. Device 10 includes a monolithic, or one-piece, housing 12 having a first portion 14 and a second portion 16 connected by a living hinge 18. The living hinge 18 is a continuous, and monolithically incorporated connector between the first and second portions 14, 16. As shown in FIGS. 2 and 6, for example, each of the first and second portions 14, 16 has openings 20 at respective opposite ends 14A, B and 16A, B, as shown in FIGS. 1 and 2. However, the openings 20 may be on only one of the first or second portions 14, 16 and/or may be at only one end, A or B (see FIG. 3). The monolithic housing 12 is adapted to be opened and closed by rotating one or both of the first and second portions 14, 16 about the living hinge 18 and then having the first and second portions 14, 16 close on one another into a closed condition (see FIGS. 3–5). The first portion 14 may have a lip 15, which is received in and aligns the first portion 14 with the second portion 16 when closed.

The second portion 16 of the monolithic housing includes a monolithically incorporated post 22, as shown in FIG. 2. The post 22 is configured to windably receive a first section of a length of cord 24, as shown in FIG. 1. The cord 24 may be manually or otherwise wound about the post 22. The second portion 16 may also include a lower opening 17, as shown in FIG. 2, which lower opening 17 extends at least partially into post 22, resulting in at least a partially hollow post 22. The lower opening 17 may be created during a molding of the device 10.

As shown in the embodiment of FIGS. 1–5, device 10 may have a through-opening 21 on a first surface 14C that penetrates through the first portion 14. Such opening 21 is configured to receive at least a part 22P (see FIG. 3) of post 22, which post 22 has a total height H (see FIG. 2). At least a portion of post 22 protrudes through opening 21 when the first and second portions 14, 16, respectively, close on one another (see FIGS. 4–5). Such a protrusion of part 22P in this embodiment of device 10 helps prevent any of the length of cord 24 from unwinding and coming off post 22.

Alternatively, as shown in the embodiment of FIG. 6, device 10A includes first portion 14 that may not have an opening in first surface 14C, such as opening 21, of device 10. The post 22 may have a height H', such that the post 22 does not protrude through first surface 14C of the first portion 14, but only reaches up to or adjacent a second surface or underside 14U of the first surface 14C of first portion 14. Thus, the embodiment of FIG. 6 is essentially the same as the embodiment of FIGS. 1–5 except for the height H' of the post 22 and except that the first portion 14 does not have a through-opening such as opening 21.

Figure 3:
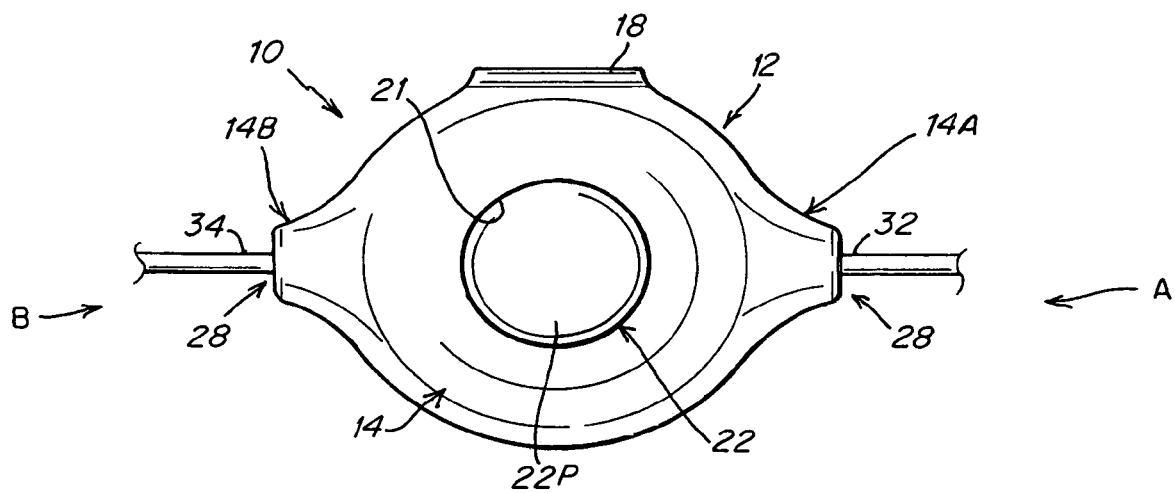
FIG. 3 is a plan view of the cord shortening device of FIG. 1, in a closed condition.
Figure 4:
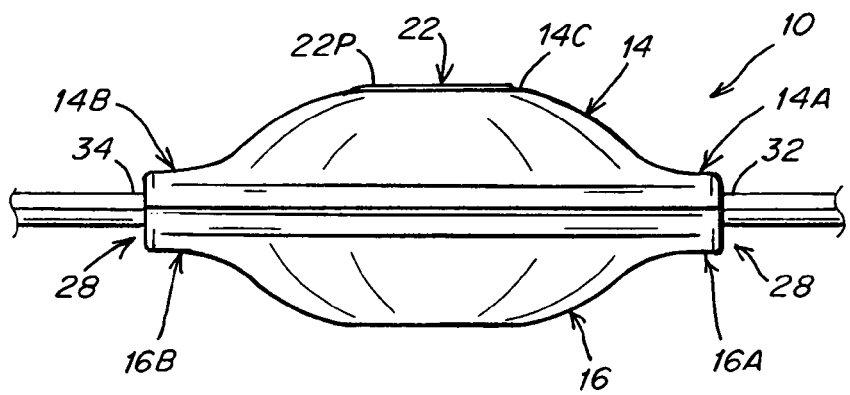
FIG. 4 is a side view of the cord shortening device of FIG. 3.
Figure 5:
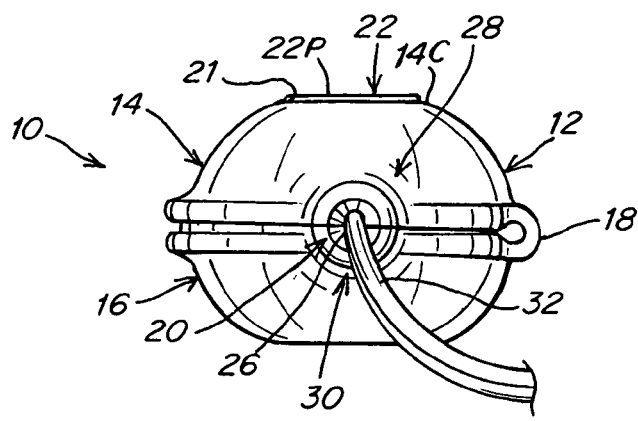
FIG. 5 is an end view of the cord shortening device of FIG. 3.
Figure 6:
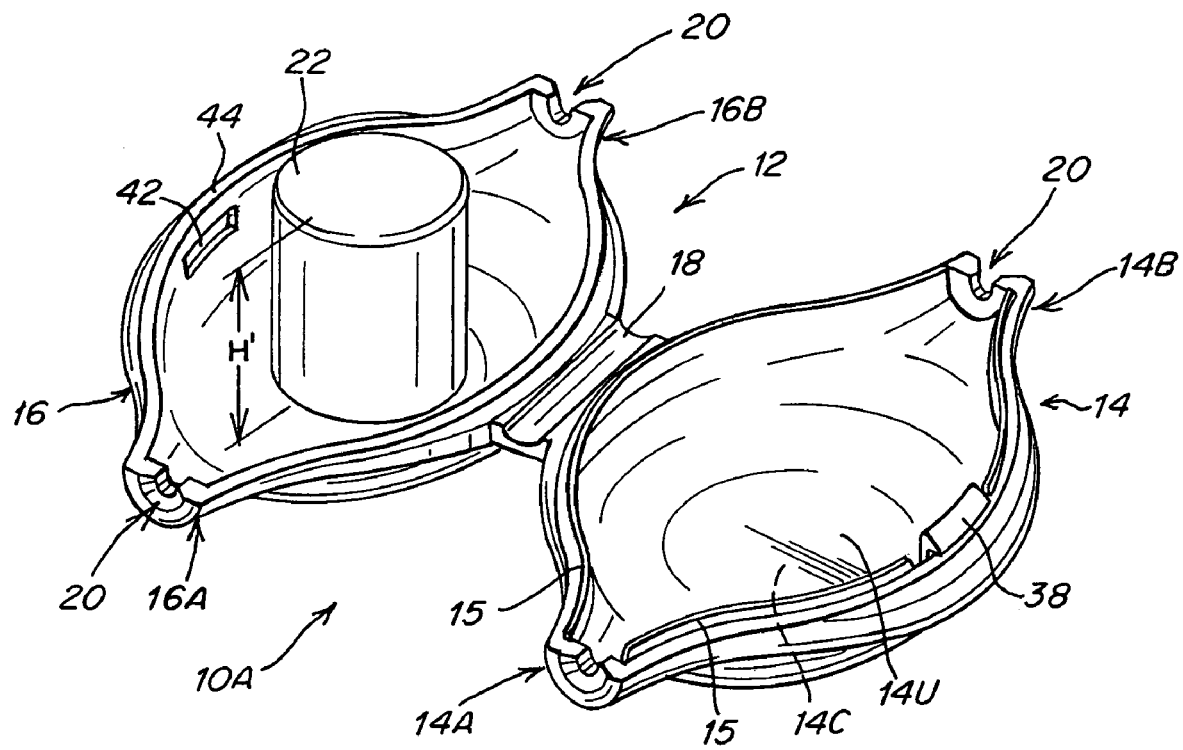
FIG. 6 is a perspective view of another embodiment of a cord shortening device, according to the principles of the present disclosure.

When the monolithic housing 12 is in a closed position (as shown in FIGS. 3–5), which occurs by rotating one or both of the first and second portions 14, 16 about the living hinge 18 (as shown in FIG. 1), at least one slot 26 is formed, from opening 20, as shown in FIG. 5. However, a slot 26 may be formed at respective opposite ends 28 of the housing 12 by the coming together of openings 20 at both ends, A and B, of the housing 12 (both openings 20 not shown). A slot or slots 26 may form enclosing mechanisms 30 for releasably enclosing second and third sections of the length of cord 32, 34 (see FIGS. 3–5).

The device 10 further includes a securing mechanism that is monolithically incorporated with the monolithic housing 12. The securing mechanism is configured such that when the first and second portions 14, 16 are closed on one another, they are held releasably secure. The securing mechanism may, for example, include interlocking elements of a snap closure. These interlocking elements may include at least one tab or protrusion 38 (shown as only one protrusion 38 in FIG. 2) on or adjacent an edge 40 of the first portion 14. Protrusion 38 has a sufficient depth 38A such that protrusion 38 securely and releasably mates with at least one recess or through opening 42 (shown as one recess 42 in FIG. 2) on or adjacent an edge 44 of the second portion 16. The location of the at least one protrusion 38 and the at least one recess 42 may be reversed, with the at least one protrusion 38 on the second portion 16, and the at least one recess 42 on the first portion 14. The portions 14, 16 should be flexible or resilient enough to bend and release the protrusion 38 from the recess 42, thereby opening the device 10, when, for example, portion 14 is pushed inward at, for example, location 14L adjacent the protrusion 38. Otherwise, the secured nature of the mating of protrusion 38 and recess 42 may make it difficult to open the device 10, which difficulty may be a desirable situation to prevent, for example, a child from opening the device 10.

Figure 7:
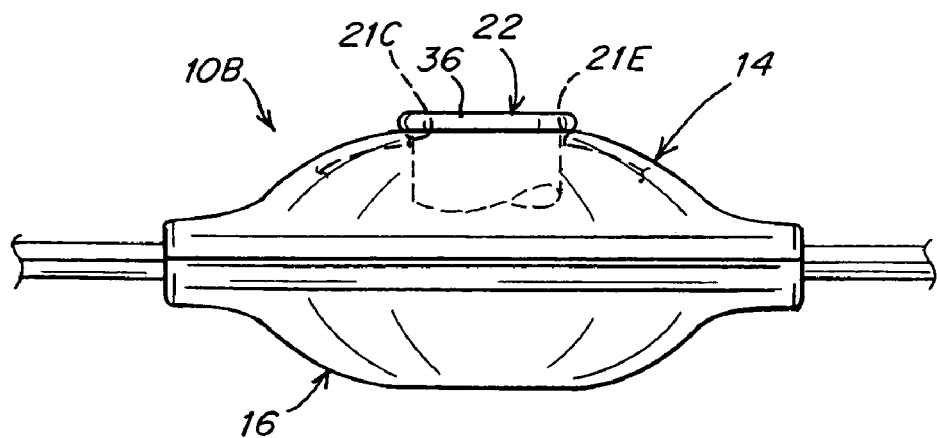
FIG. 7 is a side view of another embodiment of a cord shortening device, according to the principles of the present disclosure.

Alternatively, in another embodiment, such as device 10B shown in FIG. 7, the securing mechanism may, for example, include a top portion 36 of the post 22 being configured such that the top portion 36 resiliently and releasably mates with all or part of an edge 21E of a circumference 21C surrounding opening 21 on first surface 14C of first portion 14. All or part of the edge 21E is configured such that, when mated in a snapping manner with top portion 36, the first and second portions 14, 16, respectively, are releasably and securely held together when they are closed on one another. Other, differently shaped and/or structured monolithic or integrally connected securing mechanisms may be used to releasably secure the first and second portions 14, 16 together. The securing mechanisms may also be external to the device 10.

When the device 10 is in a closed position, the first section of the length of cord 24 is stored in the monolithic housing 12 and the second and third sections of the length of cord 32, 34 are releasably enclosed by the enclosing mechanisms 30, as shown in FIGS. 3–5.

The monolithic housing 12, living hinge 18, post 22 and the securing mechanisms may be made of molded plastic, rubber or comparable material providing the desired resiliency and facilitating the operation of the living hinge 18, the enclosing mechanisms 30 and the securing mechanisms.

The post 22, shown as a cylindrical shape in FIG. 2, may be tapered at one or both ends and may be substantially centered or centrally located in the lower portion 16, as shown in FIG. 2, or be otherwise located as part of the housing 12. Other shapes of post 22 are possible.

The monolithic housing 12 may be in the shape of a clam shell, as shown in the embodiments of FIGS. 1–7. Other shapes or configurations are possible, for example, such as shapes in the form of humans, other animals, reptiles or insects.

Overall, the embodiments of the cord shortening devices 10, 10A, 10B of the present disclosure store and secure an excess length of cord from, for example, electrical appliances in children's rooms to help prevent accidents. The monolithic structure of the cord shortening devices 10, 10A, 10B, with their monolithic housing 12, post 22, first and second portions 14, 16 connected by the living hinge 18, and the securing mechanisms, aids in economical manufacturing and ease of use for the consumer. The monolithic securing mechanisms, post 22 and living hinge 18 connecting the first and second portions 14, 16 eliminates the need for assembly. The living hinge 18 helps prevent loss of the lid 14. The post 22 helps to ensure that a desired length of cord is windable and storable in the device 10. A post 22 having at least height H' helps to ensure that the first section of cord 24 cannot unwind and come off the post 22.

Figure 8:
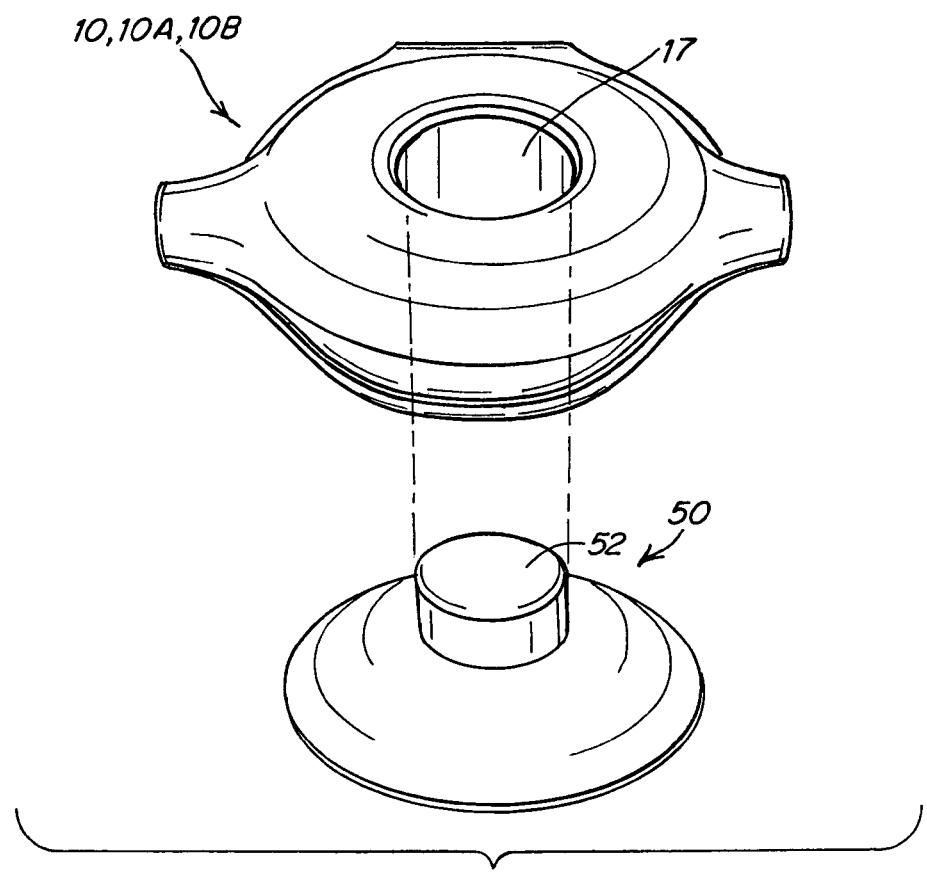
FIG. 8 is an exploded perspective view of a connecting element and the cord shortening device of FIG. 2.
Figure 9:
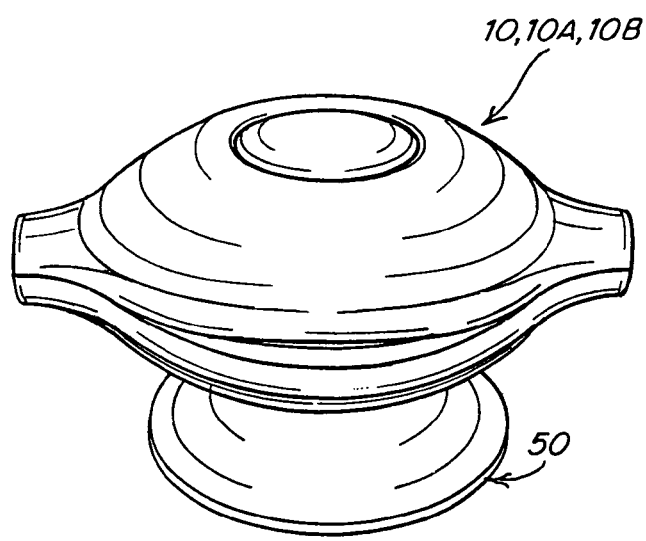
FIG. 9 is a perspective view of a connecting element attached to the cord shortening device of FIG. 8.

The cord shortening devices 10, 10A, 10B may also include a connecting element, such as, for example, a suction element or suction cup 50, as shown in FIG. 8. Suction cup 50 is adapted to be attached to the second portion 16. That attachment may be, for example, by an interference fit of a protrusion 52 on the suction cup 50 with lower opening 17, which lower opening 17 is adapted to receive the protrusion 52 (see FIGS. 8 and 9). The suction cup 50 or equivalent connecting element, once fitted into the opening 17 (see FIG. 8) may be used to releasably attach the cord shortening device 10, 10A, 10B, which may have, for instance, a portion of an electrical cord from a lamp in a baby's room releasably enclosed therein (not shown), to a support (not shown), such as a wall area adjacent, for example, an electrical plug receptacle (not shown). A portion of the electrical cord may be dangling loose adjacent the plug receptacle. Therefore, attaching the cord shortening device 10, 10A, 10B to the wall area is useful in locating the portion of the electrical cord at a place in which that portion of cord poses less of a potential danger for a child in the vicinity of the plug receptacle.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

I claim:

1. A cord shortening device, comprising:
   a monolithic housing having a first portion and a second portion monolithically connected by a living hinge, the monolithic housing being adapted to open and close by at least one of the first and second portions rotating about the living hinge;
   one of the portions including a monolithically incorporated post configured to windably receive a first section of a length of cord;
   at least one of the first and second portions having an opening at at least one end of at least one of the portions to receive second and third sections of cord;
   a securing mechanism including interlocking elements, the securing mechanism being monolithically incorporated with the housing and configured such that when the first and second portions are closed on each other, they are held releasably secure; and
   wherein the first portion has an opening on a first surface, the opening configured to receive at least a part of the post when the first and second portions are closed on one another.

2. The device of claim 1, the monolithic housing further having at least one enclosing mechanism formed by the opening when the first and second portions are closed on each other configured to releasably enclose at least one of the second and third sections of the length of cord.

3. The device of claim 2, further including a securing mechanism monolithically incorporated with the housing and configured such that when the first and second portions are closed on each other, they are held releasably secure, and the first section of the length of cord is stored in the monolithic housing and the second and third sections of the length of cord are enclosed, respectively, by the at least one enclosing mechanism.

4. The device of claim 2, wherein the at least one enclosing mechanism includes two enclosing mechanisms, one for each of the second and third sections of the length of cord.

5. The device of claim 2, wherein both of the first and second openings have a substantially equal portion of the opening which is formed when closed.

6. The device of claim 1, wherein the interlocking elements include a protrusion on the first portion that securedly and releasably mates with a recess in the second portion.

7. The device of claim 1, wherein the interlocking elements include a protrusion on the second portion that securedly and releasably mates with a recess in the first portion.

8. The device of claim 1, wherein the post is monolithically included in the second portion and the interlocking elements include a top portion of the post that securedly and releasably mates with at least a part of an edge of the opening on the first surface of the first portion.

9. A cord shortening device, comprising:
a monolithic housing having a first portion and a second portion monolithically connected by a living hinge, the monolithic housing being adapted to open and close by at least one of the first and second portions rotating about the living hinge;
one of the portions including a monolithically incorporated post configured to windably receive a first section of a length of cord;
at least one of the first and second portions having an opening at at least one end of at least one of the portions to receive second and third sections of cord; and
wherein the monolithically incorporated post is monolithically included in the second portion and the monolithically incorporated post has a height such that it protrudes through an opening in a first surface of the first portion when the first and second portions are closed on one another.

10. The device of claim 9, wherein the post is monolithically included in the second portion and the post has a height such that it only reaches essentially up to an underside of the first surface of the first portion when the first and second portions are closed on one another.

11. The device of claim 9, wherein the post is centered in the second portion.

12. The device of claim 9, wherein the monolithic housing is made of molded plastic.

13. The device of claim 9, wherein the monolithic housing is of a clam-shell configuration.

14. A cord shortening device, comprising:
a monolithic housing having a first portion and a second portion monolithically connected by a living hinge, the monolithic housing beingadapted to open and close by at least one of the first and second portions rotating about the living hinge;
one of the portions including a monolithically incorporated post configured to windably receive a first section of a length of cord;
at least one of the first and second portions having an opening at at least one end of the at least one portion to receive second and third sections of cord; and
a connecting element attached to the second portion.

15. The device of claim 14, wherein an attachment of the connecting element is via an interference fit in a lower opening of the second portion.

16. The device of claim 14, wherein the connecting element, when attached to the device, is adapted to releasably attach the device to a support.

17. The device of claim 14, wherein the connecting element is a suction cup.

\* \* \* \* \*

UNITED STATES PATENT AND TRADEMARK OFFICE

Certificate

Patent No. 7,032,854 B2                          Patented: April 25, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrew W. Marsden, Hingham, MA (US); and Trung Q. Phung, Roslindale, MA(US).

Signed and Sealed this Twenty-fourth Day of June 2008.

*KATHERINE MATECKI*
*Supervisory Patent Examiner*
Art Unit 3654